(12) United States Patent
Acosta et al.

(10) Patent No.: US 11,808,385 B2
(45) Date of Patent: *Nov. 7, 2023

(54) SPLIT COUPLER FOR PIPES

(71) Applicant: Mikeysquickcoupler LLC, Gillette, WY (US)

(72) Inventors: Michael L. Acosta, Gillette, WY (US); Timothy M. Acosta, Loveland, CO (US)

(73) Assignee: MikeysQuickCoupler LLC, Gillette, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,596

(22) Filed: Jul. 7, 2022

(65) Prior Publication Data

US 2023/0003320 A1 Jan. 5, 2023

Related U.S. Application Data

(63) Continuation of application No. 16/991,829, filed on Aug. 12, 2020, now Pat. No. 11,384,873.

(60) Provisional application No. 62/961,375, filed on Jan. 15, 2020, provisional application No. 62/885,597, filed on Aug. 12, 2019.

(51) Int. Cl.
*F16L 19/00* (2006.01)
*F16L 17/04* (2006.01)
*F16L 21/06* (2006.01)

(52) U.S. Cl.
CPC .............. *F16L 17/04* (2013.01); *F16L 21/06* (2013.01)

(58) Field of Classification Search
CPC ................ F16B 37/0892; F16B 47/007; F16B 2200/30; Y10T 403/5786; Y10T 403/69; Y10T 403/7094; F16L 17/04; F16L 19/00; F16L 21/06; F16L 23/02; F16L 47/04; F16L 55/17; F16L 55/1705; F16L 55/171; F16L 55/1715
USPC .................................................. 411/433, 539
See application file for complete search history.

(56) References Cited

U.S. PATENT DOCUMENTS

| | | | | |
|---|---|---|---|---|
| 3,430,527 A | * | 3/1969 | Albert | ..................... B25B 13/48 81/176.3 |
| 4,226,164 A | | 10/1980 | Carter | |
| 11,384,873 B2 | | 7/2022 | Acosta et al. | |
| 2002/0079697 A1 | * | 6/2002 | Griffioen | .............. G02B 6/4476 285/133.11 |

(Continued)

OTHER PUBLICATIONS

U.S. Appl. No. 62/961,375, filed Jan. 15, 2020.

(Continued)

*Primary Examiner* — Aaron M Dunwoody
(74) *Attorney, Agent, or Firm* — Craig R. Miles; CR MILES P.C.

(57) ABSTRACT

A split coupler, and methods of making and using such a split coupler, whereby the split coupler includes a first semi-cylindrical member, a second semi-cylindrical member, and an interlocking assembly configured to interlock the first and second semi-cylindrical members to form a substantially cylindrical coupler having a coupler inner surface which defines a throughbore. Additionally, the split coupler can include spiral threads coupled to the coupler inner surface. Furthermore, the split coupler can include a flange inwardly extending from the coupler inner surface.

19 Claims, 14 Drawing Sheets

(56) References Cited

U.S. PATENT DOCUMENTS

2009/0025977 A1   1/2009   Anderson et al.

OTHER PUBLICATIONS

U.S. Appl. No. 62/885,597, filed Aug. 12, 2019.
Magic Plastics. Online catalog, dated 2019, https://www.magicplastics.com, 28 pages.
Magic Plastics. Union Components. Website, https://www.magicplastics.com, originally downloaded Feb. 25, 2021, 4 pages.
Corresponding Canadian Patent Application No. 3,096,083, Office Action dated Jul. 24, 2023, 3 pages.

* cited by examiner

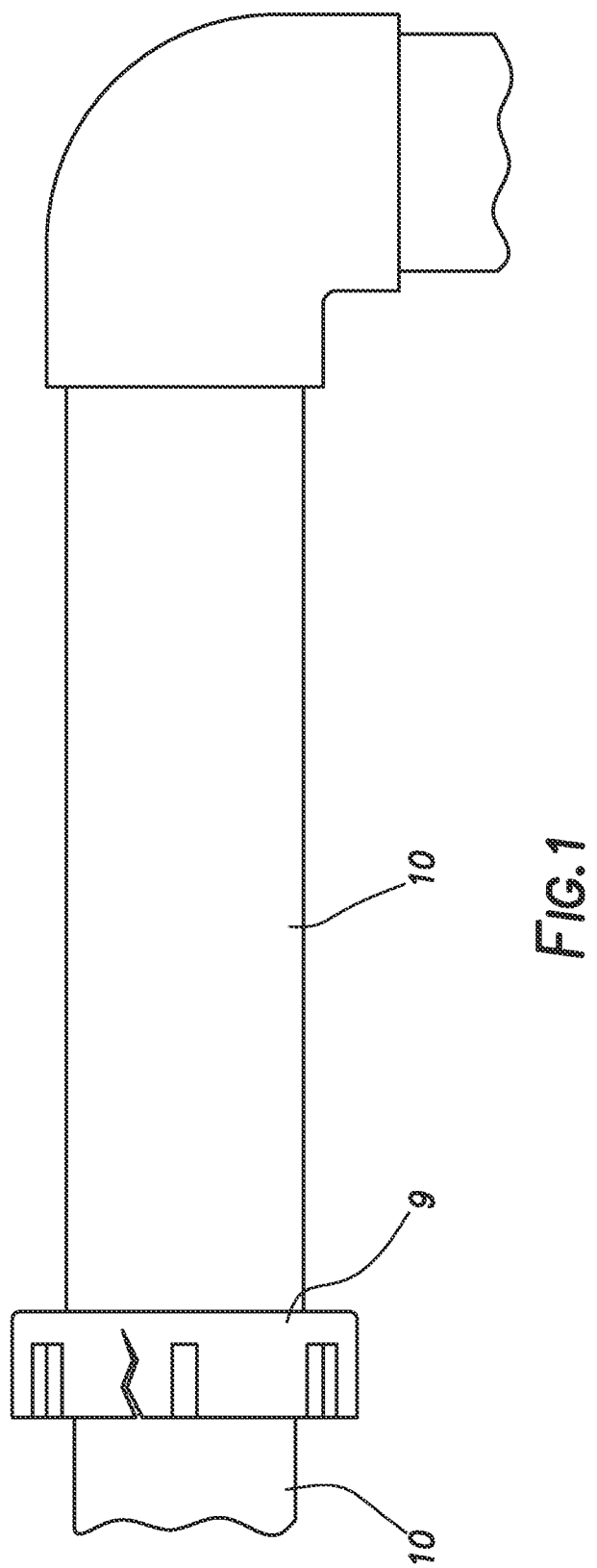

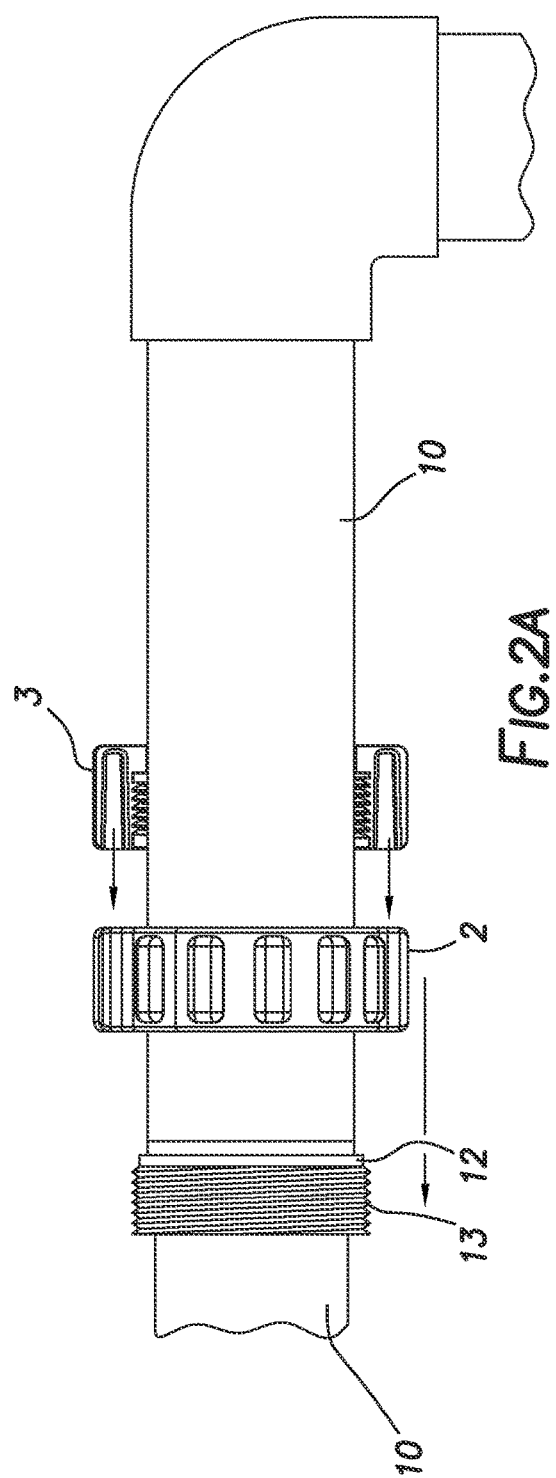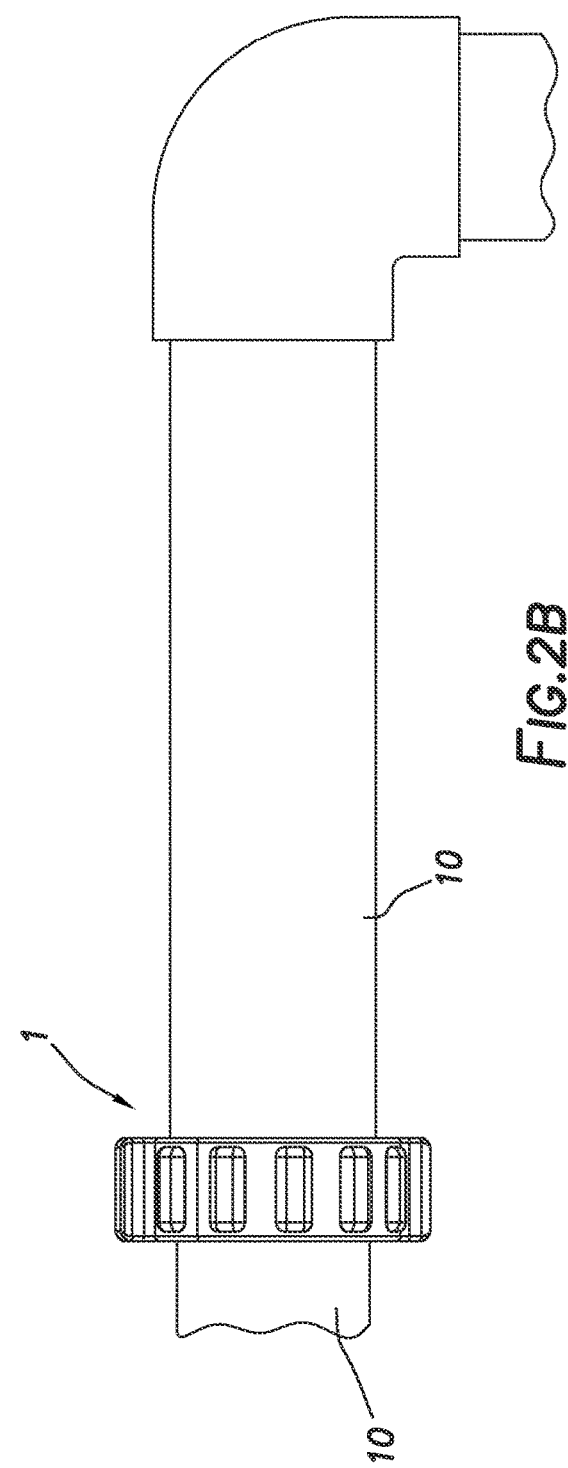

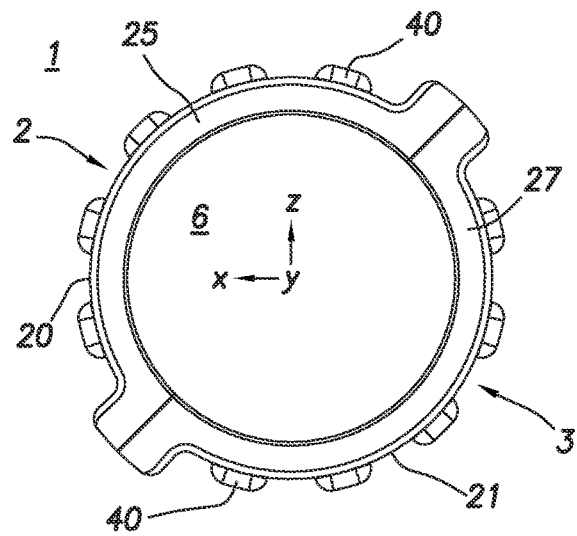
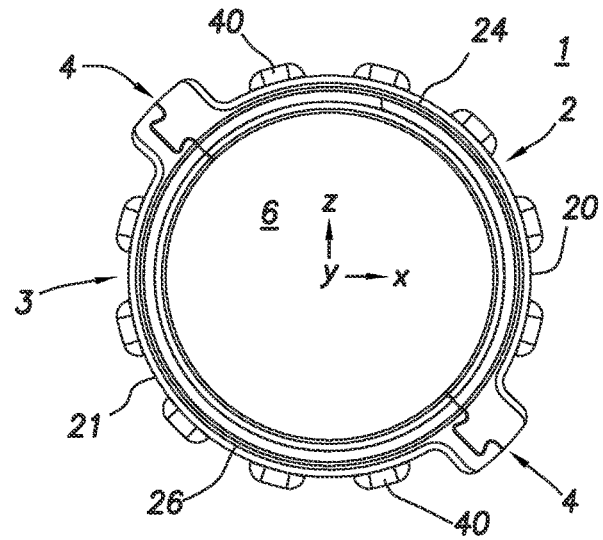
FIG.5A    FIG.5B
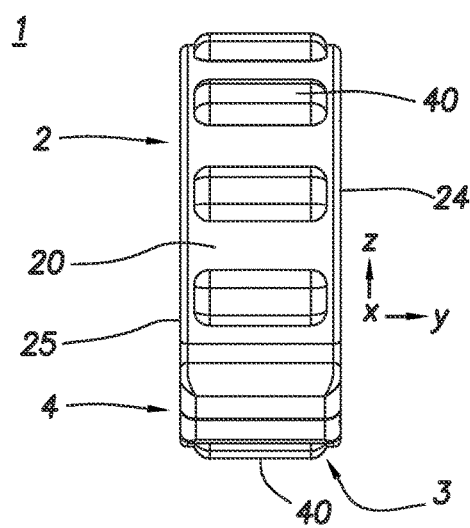
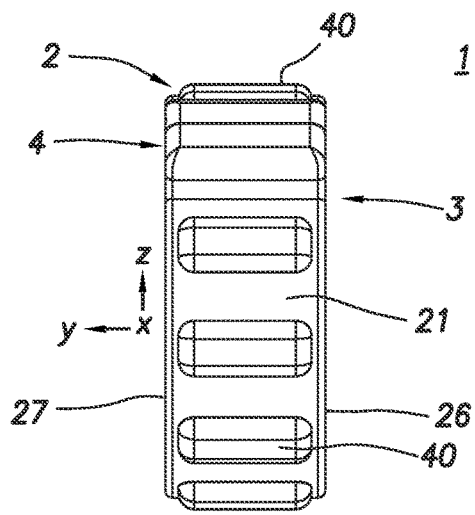
FIG.5C    FIG.5D
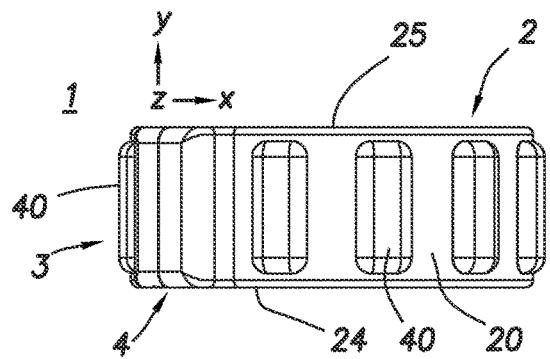
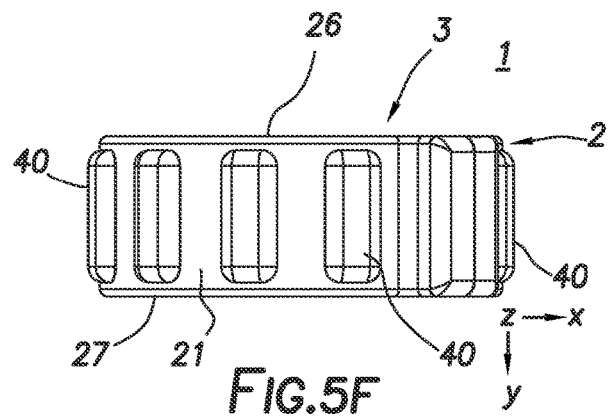
FIG.5E    FIG.5F

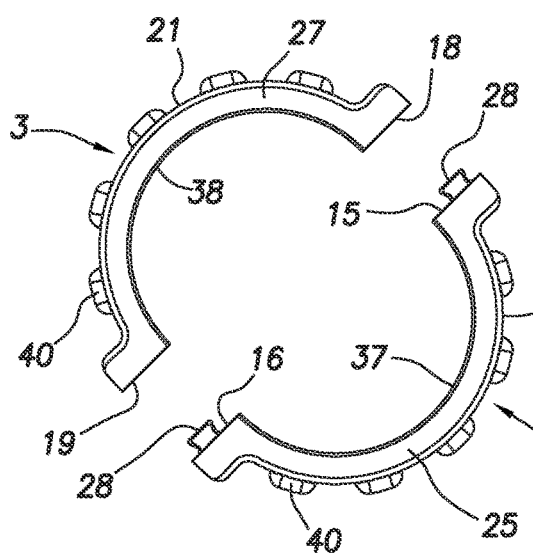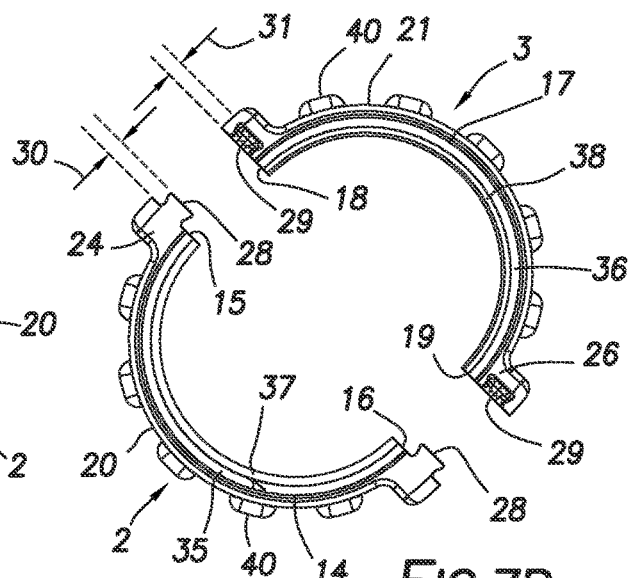
FIG.7A   FIG.7B
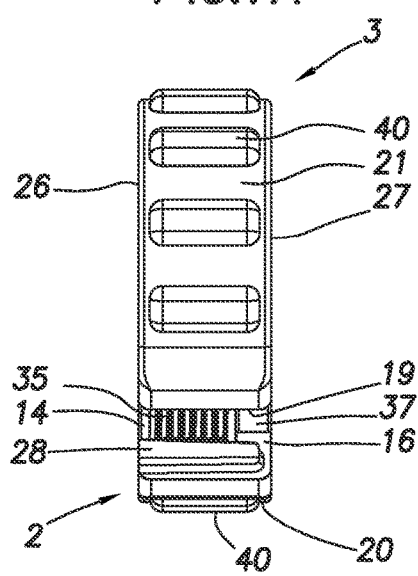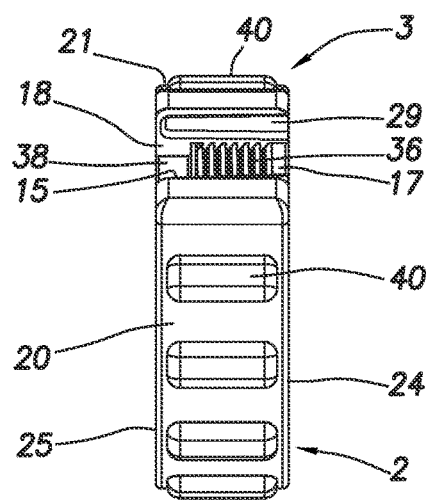
FIG.7C   FIG.7D
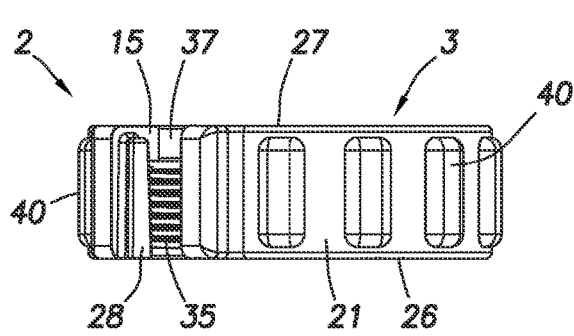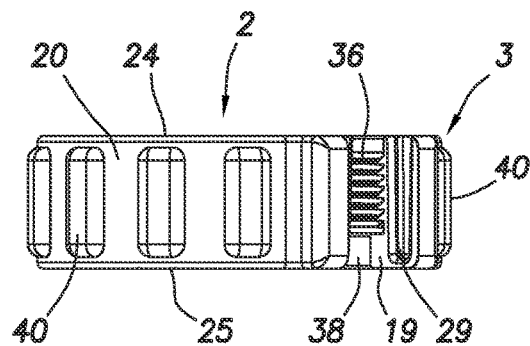
FIG.7E   FIG.7F

SPLIT COUPLER FOR PIPES

I. BRIEF SUMMARY OF THE INVENTION

A broad object of a particular embodiment of the invention can be to provide a split coupler, and methods of making and using such a split coupler, whereby the split coupler includes a first semi-cylindrical member, a second semi-cylindrical member, and an interlocking assembly configured to interlock the first and second semi-cylindrical members to form a substantially cylindrical coupler having a coupler inner surface which defines a throughbore. Additionally, the split coupler can include spiral threads coupled to the coupler inner surface. Furthermore, the split coupler can include a flange inwardly extending from the coupler inner surface into the throughbore.

Naturally, further objects of the invention are disclosed throughout other areas of the specification, drawings, and claims.

II. BRIEF DESCRIPTION OF THE DRAWINGS

FIG. 1 is an illustration of a broken connector connecting two emplaced conduits.

FIG. 2A is an illustration of a pair of semi-cylindrical members of a particular embodiment of the inventive split coupler disposed about an emplaced conduit.

FIG. 2B is an illustration of the inventive split coupler formed from the pair of interlocked semi-cylindrical members shown in FIG. 2A connecting two emplaced conduits.

FIG. 5A is a rear view of a particular embodiment of the inventive split coupler.

FIG. 5B is a front view of the split coupler shown in FIG. 5A.

FIG. 5C is a right side view of the split coupler shown in FIG. 5A.

FIG. 5D is a left side view of the split coupler shown in FIG. 5A.

FIG. 5E is a top view of the split coupler shown in FIG. 5A.

FIG. 5F is a bottom view of the split coupler shown in FIG. 5A.

FIG. 7A is a rear view of the first and second semi-cylindrical members of a particular embodiment of the inventive split coupler.

FIG. 7B is a front view of the first and second semi-cylindrical members shown in FIG. 7A.

FIG. 7C is a right side view of the first and second semi-cylindrical members shown in FIG. 7A.

FIG. 7D is a left side view of the first and second semi-cylindrical members shown in FIG. 7A.

FIG. 7E is a top view of the first and second semi-cylindrical members shown in FIG. 7A.

FIG. 7F is a bottom view of the first and second semi-cylindrical members shown in FIG. 7A.

III. DETAILED DESCRIPTION OF THE INVENTION

Figure 3A:
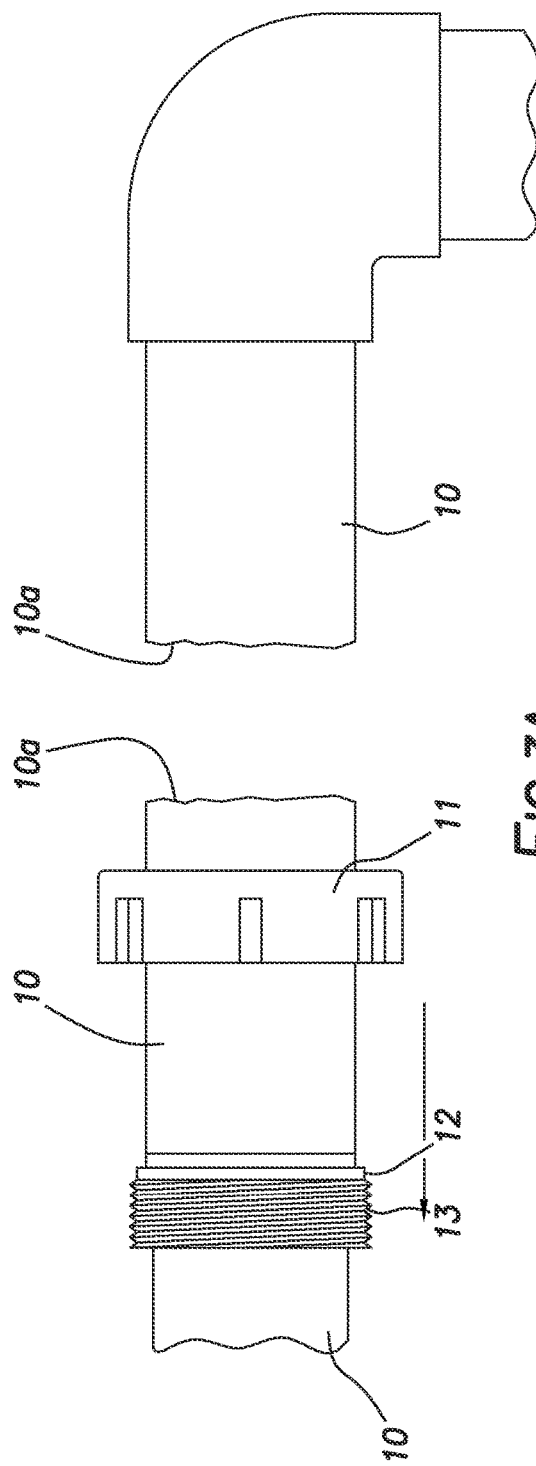
FIG. 3A is an illustration of an emplaced conduit which has been cut to allow disposition of a conventional connector thereabout.

Now referring primarily to FIGS. 1 through 2B, which illustrate a method of using a particular embodiment of the inventive split coupler (1) including a first semi-cylindrical member (2), a second semi-cylindrical member (3), and an interlocking assembly (4) configured to interlock (or connect together) the first and second semi-cylindrical members (2)(3) to form a substantially cylindrical split coupler (1) having a coupler inner surface (5) which defines a throughbore (6). Further, the split coupler (1) can include spiral threads (7) coupled to the coupler inner surface (5). Moreover, the split coupler (1) can include a flange (8) inwardly extending from the coupler inner surface (5).

Now referring primarily to FIG. 1, the instant split coupler (1) may be especially useful to replace a broken connector (9) connecting emplaced conduits (10) or pipes.

Figure 3B:
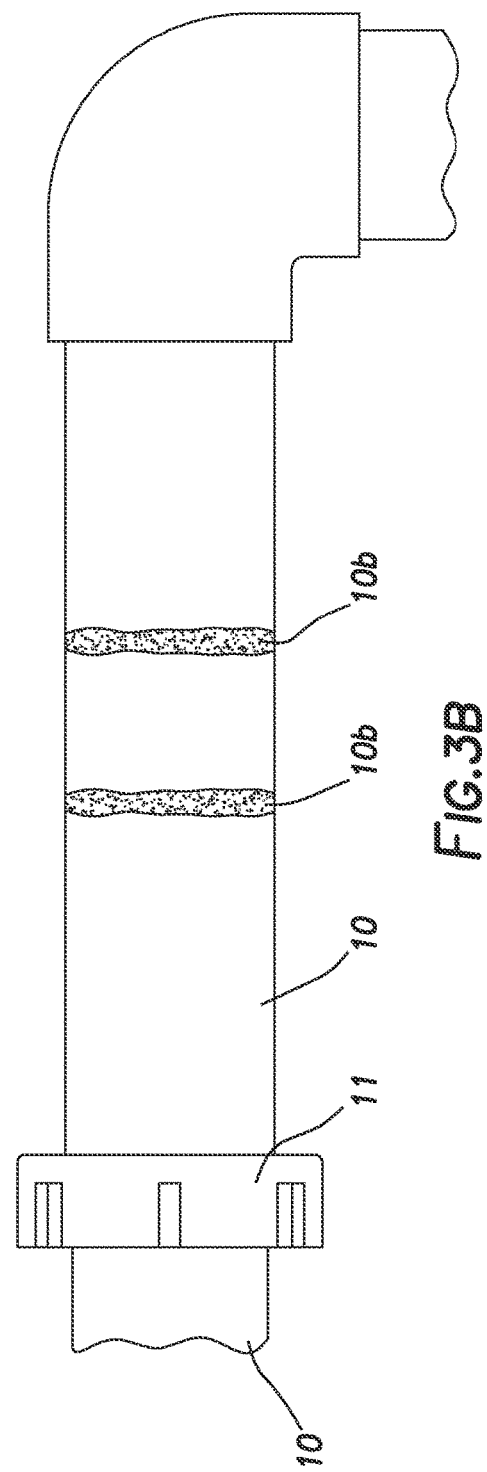
FIG. 3B is an illustration of the emplaced conduit shown in FIG. 3A, but whereby the cut portion has been repaired and the conventional connector is connecting two emplaced conduits.
Figure 4B:
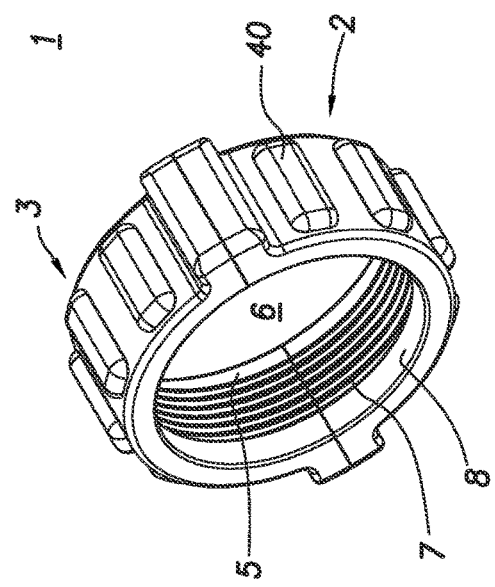
FIG. 4B is another perspective view showing the rear of the split coupler shown in FIG. 4A.
Figure 4D:
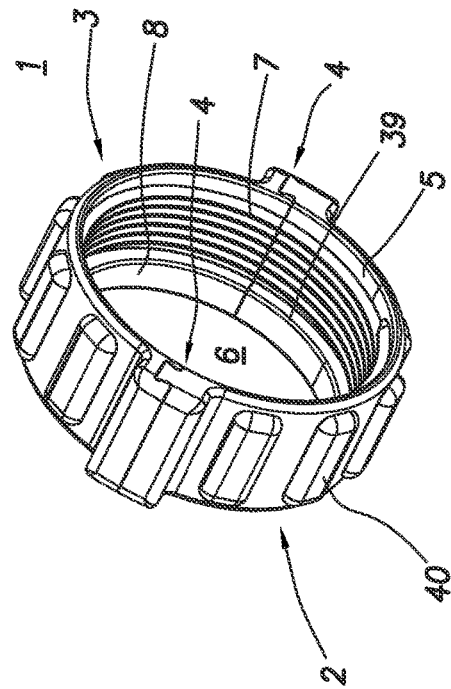
FIG. 4D is another perspective view showing the front of the split coupler shown in FIG. 4A.
Figure 4A:
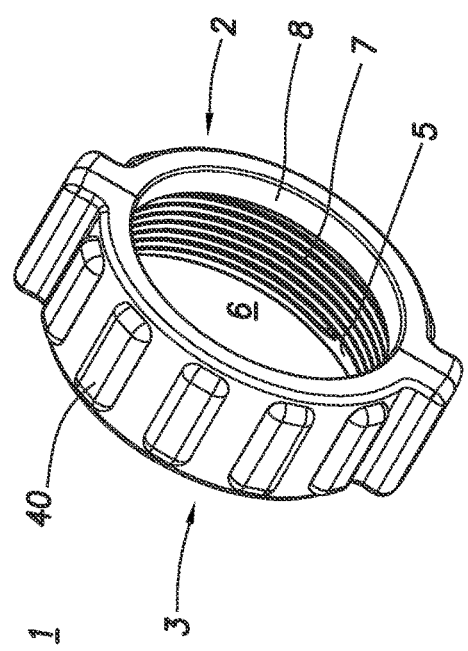
FIG. 4A is a perspective view showing the rear of a particular embodiment of the inventive split coupler.
Figure 4C:
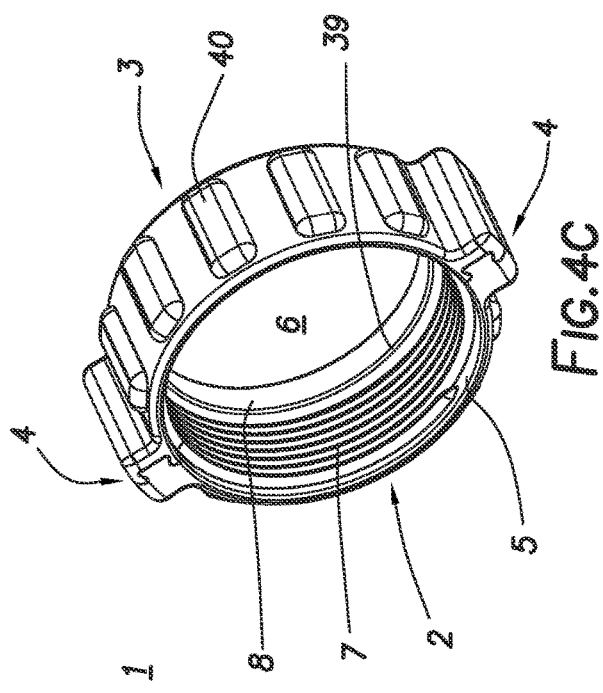
FIG. 4C is a perspective view showing the front of the split coupler shown in FIG. 4A.
Figure 6A:
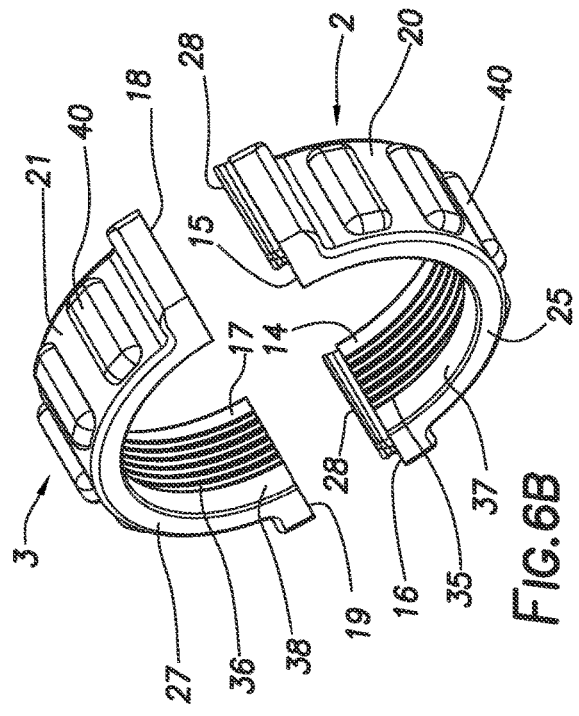
FIG. 6A is a perspective view showing the rear of the first and second semi-cylindrical members of a particular embodiment of the inventive split coupler.
Figure 6B:
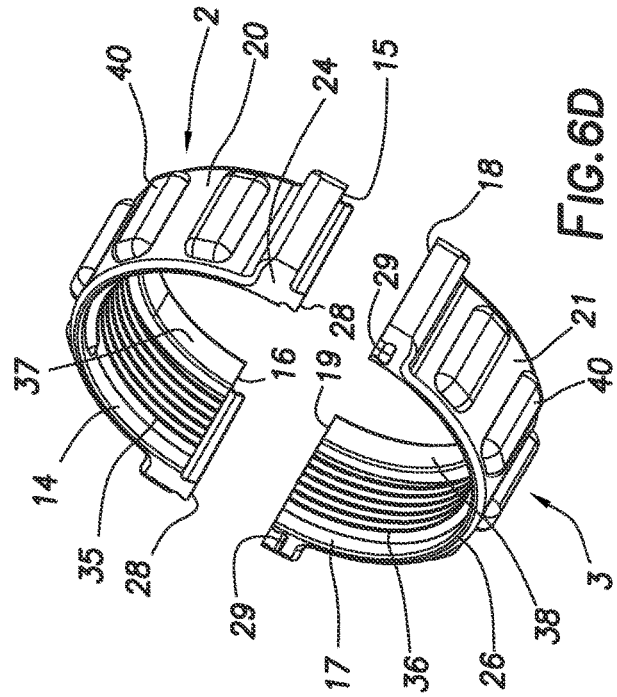
FIG. 6B is another perspective view showing the rear of the first and second semi-cylindrical members shown in FIG. 6A.
Figure 6C:
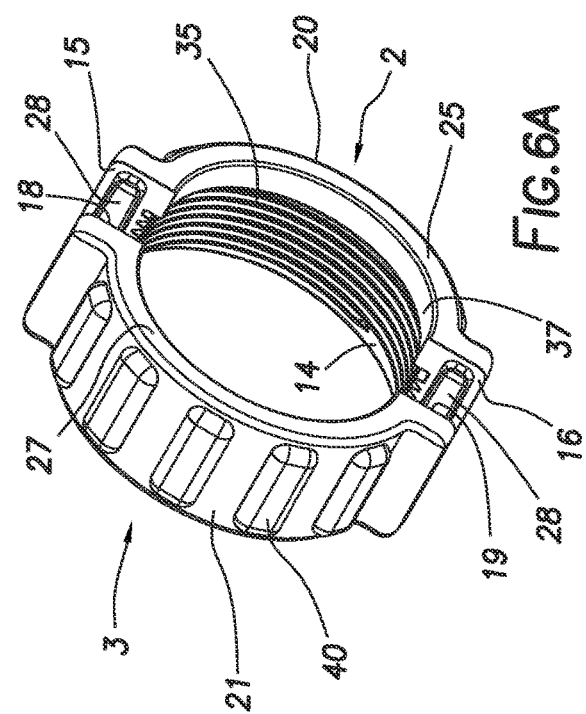
FIG. 6C is a perspective view showing the front of the first and second semi-cylindrical members shown in FIG. 6A.
Figure 6D:
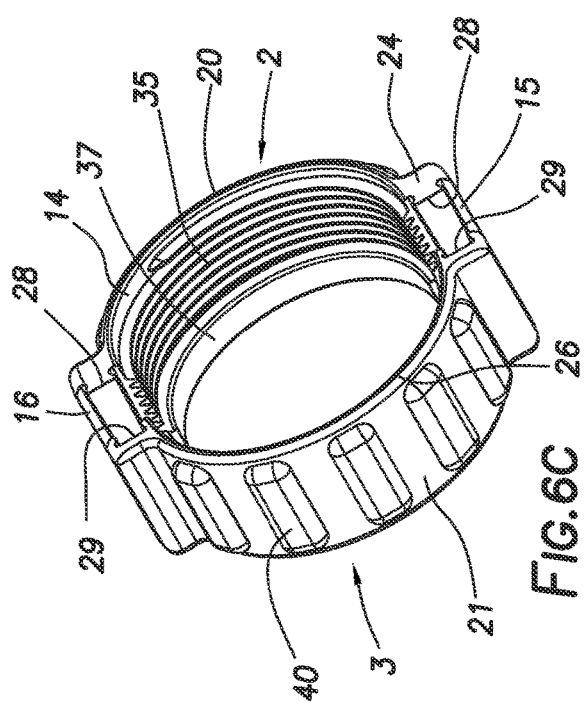
FIG. 6D is another perspective view showing the front of the first and second semi-cylindrical members shown in FIG. 6A.
Figure 8A:
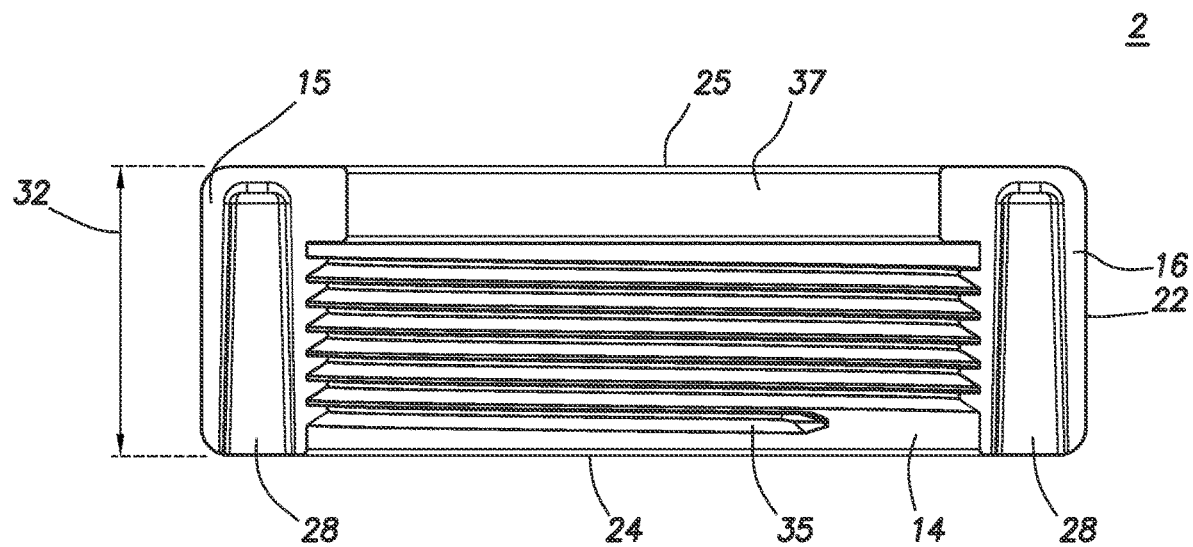
FIG. 8A is a view of the inner surface and terminal edges of a particular embodiment of the first semi-cylindrical member.
Figure 8B:
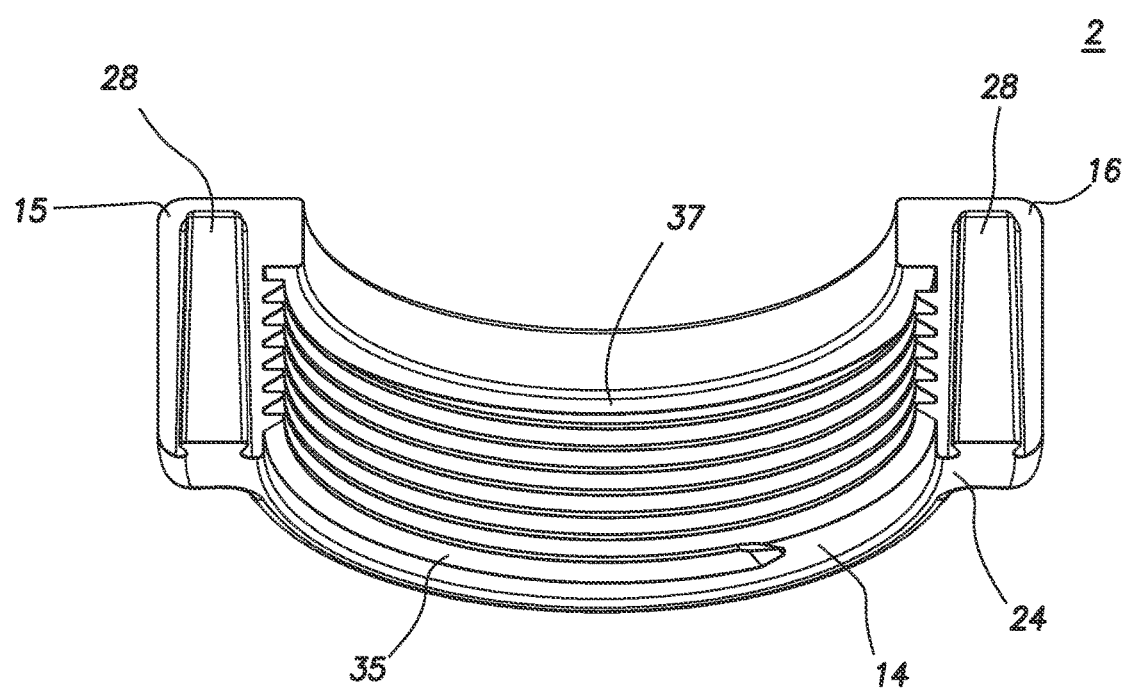
FIG. 8B is a perspective view of the inner surface and terminal edges of the first semi-cylindrical member shown in FIG. 8A.
Figure 9A:
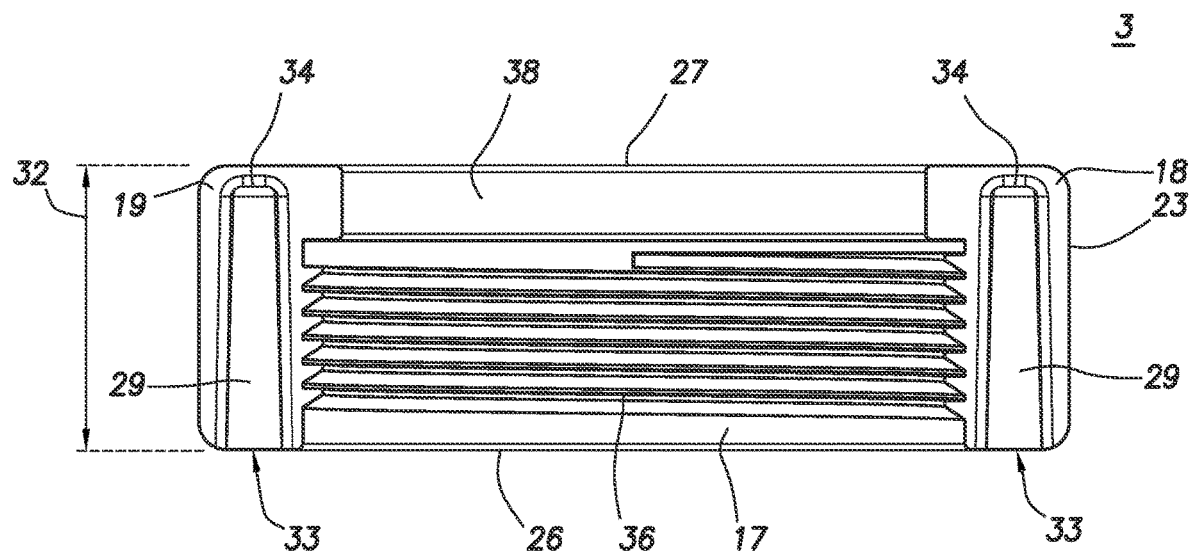
FIG. 9A is a view of the inner surface and terminal edges of a particular embodiment of the second semi-cylindrical member.
Figure 9B:
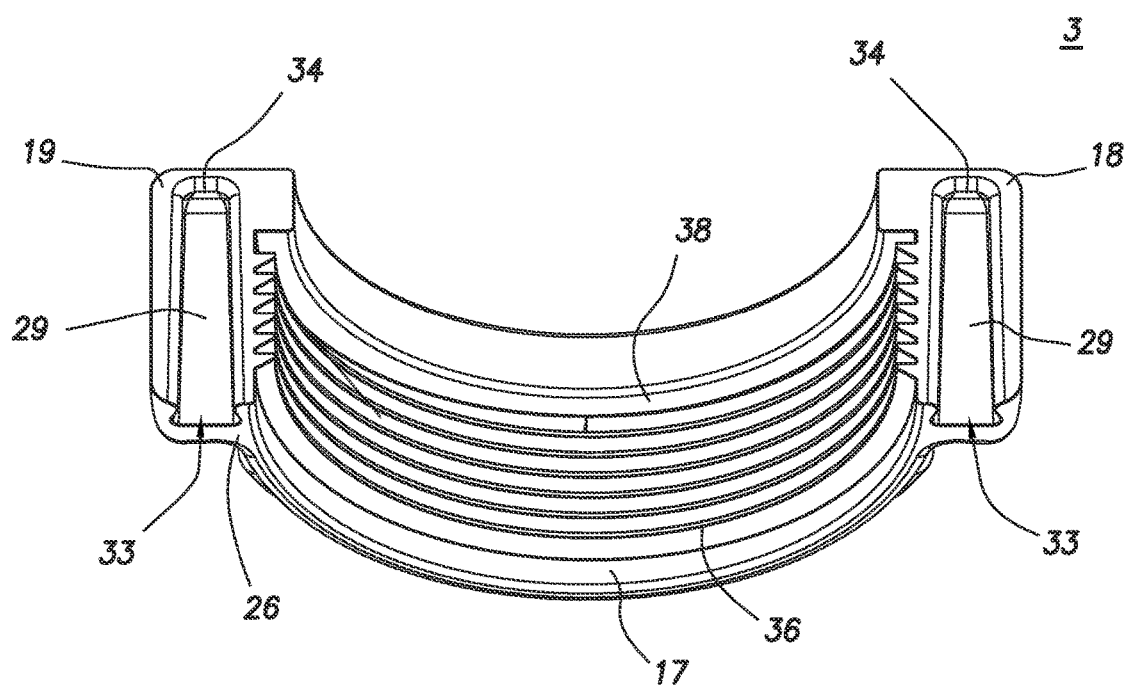
FIG. 9B is a perspective view of the inner surface and terminal edges of the second semi-cylindrical member shown in FIG. 9A.

Now referring primarily to FIGS. 3A and 3B, a conventional connector (11) may be configured as a continuously annular cylinder. Consequently, to dispose such a connector (11) about an emplaced conduit (10), for example to replace a broken connector (9), the emplaced conduit (10) may have to be cut (10a) to allow axial receipt of the conduit (10) within the connector (11) to correspondingly dispose the connector (11) about the conduit (10) (as shown in the example of FIG. 3A). Subsequently, the cut conduit (10) must be repaired (10b) (as shown in the example of FIG. 3B), whereby not only may it be challenging to properly repair the cut conduit (10), but also the repaired conduit (10) may be inferior relative to the original, uncut conduit (10).

Conversely, as opposed to a continuously annular cylinder, the instant split coupler (1) is divided longitudinally (the term "longitudinal" and derivatives thereof can refer to the direction of the longitudinal axis of the conduit (10) about which the split coupler (1) is intended to dispose and correspondingly, the direction of the pass-through axis of the split coupler (1)). Following, to replace a broken connector (9), the first and second semi-cylindrical members (2)(3) can be radially disposed about the emplaced conduit (10) to receive the conduit (10) therebetween. Next, the first and second semi-cylindrical members (2)(3) can be axially aligned (for example, by relative sliding) and connected to one another (or interlocked) to dispose the split coupler (1) about the emplaced conduit (10) (as shown in the example of FIG. 2A). Subsequently, the split coupler (1) can then been rotated about the conduit (10) to couple an end, such as a flanged end (12), of the emplaced conduit (10), to an end, such as a threaded end (13), of another adjacent, axially-aligned conduit (10). Upon coupling via the instant split coupler (1), the two conduits (10) can be securely connected or united and thus, precluded from relative separation. Of course, this method advantageously does not require an emplaced conduit (10) to be cut to dispose the split coupler (1) thereabout.

Herein, reference may be made to the term axial, whereby axial can mean along the direction of the longitudinal axis of the conduit (10) about which the split coupler (1) is intended to dispose, and/or the direction of the pass-through axis of the split coupler (1), and/or along the direction of the Y axis as shown in FIGS. 5A through 5D.

Now referring primarily to FIGS. 4A through 13B, the longitudinally divided split coupler (1) includes first and second semi-cylindrical members (2)(3) which are separate or discrete or independent from one another. Each semi-cylindrical member (2)(3) includes an arcuate inner surface extending between opposing first and second terminal edges. Specifically, the first semi-cylindrical member (2) can include a first semi-cylindrical member inner surface (14) extending between opposing first semi-cylindrical member first and second terminal edges (15)(16), and the second semi-cylindrical member (3) can include a second semi-cylindrical member inner surface (17) extending between opposing second semi-cylindrical member first and second terminal edges (18)(19).

Additionally, each semi-cylindrical member (2)(3) can include an arcuate outer surface, namely a first semi-cylindrical member outer surface (20) extending between the opposing first semi-cylindrical member first and second terminal edges (15)(16), and a second semi-cylindrical member outer surface (21) extending between the opposing second semi-cylindrical member first and second terminal edges (18)(19), whereby the outer surface (20)(21) can dispose in substantially parallel relation to the inner surface (14)(17); following, the wall disposed therebetween, namely a first semi-cylindrical member wall (22) and a second semi-cylindrical member wall (23), can have a substantially uniform thickness between the terminal edges (15)(16)(18)(19). In addition to being connected together by the terminal edges (15)(16)(18)(19), the inner and outer surfaces can be connected together by opposing axial surfaces and specifically, the first semi-cylindrical member inner and outer surfaces (14)(20) can be connected together by opposing first semi-cylindrical member first and second axial surfaces (24)(25), and the second semi-cylindrical member inner and outer surfaces (17)(21) can be connected together by opposing second semi-cylindrical member first and second axial surfaces (26)(27).

Concerning size, the split coupler (1) and correspondingly, the first and second semi-cylindrical members (2)(3), can be proportioned in accordance with the conduits (10) about which they are intended to dispose and couple. For example, the split coupler (1) can be configured such that the throughbore (6) can be approximately the size of the outer diameter of the conduits (10) needing coupling.

To form the split coupler (1), the terminal edges (15)(16)(18)(19) of the first and second semi-cylindrical members (2)(3) can be matably engaged. Explicitly, the first semi-cylindrical member first terminal edge (15) can matably engage with the second semi-cylindrical member first terminal edge (18), and the first semi-cylindrical member second terminal edge (16) can matably engage with the second semi-cylindrical member second terminal edge (19).

Again referring primarily to FIGS. 4A through 13B, the split coupler (1) further includes an interlocking assembly (4) configured to interlock the first and second semi-cylindrical members (2)(3) to form the substantially cylindrical split coupler (1). As to particular embodiments, the interlocking assembly (4) can be proximate or coupled to the first and second terminal edges (15)(16)(18)(19) of the first and second semi-cylindrical members (2)(3).

As to particular embodiments, the interlocking assembly (4) associated with each of the first semi-cylindrical member first and second terminal edges (15)(16) can have a similar configuration or the same configuration, and the interlocking assembly (4) associated with each of the second semi-cylindrical member first and second terminal edges (18)(19) can have a similar configuration or the same configuration.

As to particular embodiments, the interlocking assembly (4) can include a protrusion (28) or tongue outwardly extending from each of the first semi-cylindrical member first and second terminal edges (15)(16), and specifically outwardly extending from the edge face in a direction which can be in angled relation, for example in orthogonal relation, to the edge face. Further, the interlocking assembly (4) can include a corresponding recess (29) or groove or channel inwardly extending into each of the second semi-cylindrical member first and second terminal edges (18)(19), and specifically inwardly extending from the edge face in a direction which can be in angled relation, for example in orthogonal relation, to the edge face. Following, the protrusions (28) of the first semi-cylindrical member (2) can be received within the recesses (29) of the second semi-cylindrical member (3) for frictional engagement; in this way, the first semi-cylindrical member first terminal edge (15) can couple with the second semi-cylindrical member first terminal edge (18), and the first semi-cylindrical member second terminal edge (16) can couple with the second semi-cylindrical member second terminal edge (19) to interlock the first and second semi-cylindrical members (2)(3).

As to particular embodiments, the interlocking assembly (4) can interlock as a result of axial movement, as opposed to interlocking via radial movement. Thus, after disposition about a conduit (10), the first and second semi-cylindrical members (2)(3) can be interlocked by axially sliding one of the semi-cylindrical members (2)(3) relative to the other semi-cylindrical member (2)(3) to slidably dispose the protrusions (28) within the corresponding recesses (29).

Now referring primarily to FIG. 7B, as to particular embodiments, the height (30) of the protrusion (28) and the corresponding depth (31) of the recess (29) can each include a dovetail or wedge configuration. For example, the protrusion (28) can taper proximate the first semi-cylindrical member first or second terminal edge (15)(16) and flare distal (or outwardly) from the first semi-cylindrical member first or second terminal edge (15)(16). Compatibly, the recess (29) can taper proximate the second semi-cylindrical member first or second terminal edge (18)(19) and flare distal (or inwardly) from the second semi-cylindrical member first or second terminal edge (18)(19).

Now referring primarily to FIGS. 8A through 9B and 12A through 13B, the protrusion (28) and the recess (29) can each extend along the length (32) of its respective terminal edge (15)(16)(18)(19), whereby the length (32) of the terminal edge (15)(16)(18)(19) extends between the opposing axial surfaces (24)(25)(26)(27).

As to particular embodiments, the protrusion (28) and the recess (29) can each extend along the entirety of the length (32) of its respective terminal edge (15)(16)(18)(19) between the opposing axial surfaces (24)(25)(26)(27) (not shown). Accordingly, each end of the length of the recess (29) can be open and the protrusion (28) can be slidably received within the recess (29) from either end. Thus, the first and second semi-cylindrical members (2)(3) can slidably engage from either axial direction or can be configured for multidirectional slidable engagement.

Again referring primarily to FIGS. 8A through 9B and 12A through 13B, as to other particular embodiments, the protrusion (28) and the recess (29) can each extend along only a portion, meaning less than the entirety, of the length (32) of its respective terminal edge (15)(16)(18)(19) between the opposing axial surfaces (24)(25)(26)(27). Consequently, one end of the length of the recess (29) can be open (33) and the opposing end can be closed (34). Thus, the protrusion (28) can be slidably received within the recess (29) from only the open end (33), and the first and second semi-cylindrical members (2)(3) can slidably engage from only one axial direction or can be configured for unidirectional slidable engagement. Further, the closed end (34) of the recess (29) can function as a stop surface which, upon abutment by the end of the protrusion (28), can preclude further axial travel of the protrusion (28) and correspondingly, the first semi-cylindrical member (2), in that direction. Notably, this configuration mandating unidirectional sliding engagement and including a stop surface may be advantageous for axial alignment of the first and second semi-cylindrical members (2)(3) such that the first and second semi-cylindrical members (2)(3) dispose in a desired position, such as a desired axial position, relative to one another when interlocked.

Again referring primarily to FIGS. 8A through 9B and 12A through 13B, as to particular embodiments, the length of the protrusion (28) and the corresponding recess (29) can each include a dovetail or wedge configuration. For example, the protrusion (28) can flare proximate the first semi-cylindrical member first axial surface (24) and taper approaching the first semi-cylindrical member second axial surface (25). Compatibly, the recess (29) can flare proximate the second semi-cylindrical member first axial surface (26) and taper approaching the second semi-cylindrical member second axial surface (27). Notably, this configuration can also mandate unidirectional sliding engagement, which may be advantageous for axial alignment of the first and second semi-cylindrical members (2)(3) such that the first and second semi-cylindrical members (2)(3) dispose in a desired position, such as a desired axial position, relative to one another when interlocked.

As to particular embodiments, the protrusion (28) can be integrated with the first semi-cylindrical member first or second terminal edge (15)(16) and/or the first semi-cylindrical member (2) to provide a one-piece or single or monolithic or integrated construct, meaning typically inseparable under normal conditions during routine use. Additionally, as to particular embodiments, the recess (29) can be integrated with the second semi-cylindrical member first or second terminal edge (18)(19) and/or the second semi-cylindrical member (3) to provide a similar one-piece or single or monolithic or integrated construct.

Now referring primarily to FIGS. 4A through 4D, 6A through 6D, 8A through 9B, 10A, and 11 through 13B, the split coupler (1) can include spiral threads (7) coupled to the coupler inner surface (5) (*i*) about the throughbore (6) and/or (ii) to extend into the throughbore (6), whereby this internal threading can be configured to match an externally threaded end (13) of a conduit (10).

As the split coupler (1) is comprised of the first and second semi-cylindrical members (2)(3), the first semi-cylindrical member (2) can include first threads (35) coupled to the first semi-cylindrical member inner surface (14) and extending between the first semi-cylindrical member first and second terminal edges (15)(16), and the second semi-cylindrical member (3) can include second threads (36) coupled to the second semi-cylindrical member inner surface (17) and extending between the second semi-cylindrical member first and second terminal edges (18)(19). The first and second threads (35)(36) can each be configured as parallel and axially offset; following, upon interlocking of the first and second semi-cylindrical members (2)(3), the first and second threads (35)(36) can axially align to form spiral threads (7) proximate the coupler inner surface (5).

Notably, because the instant split coupler (1) is not comprised of one continuously annular cylinder and instead includes separate first and second semi-cylindrical members (2)(3) which must be interlocked to form the split coupler (1), proper axial alignment of the first and second threads (35)(36) is necessary upon interlocking to form the spiral threads (7) on the coupler inner surface (5) of the split coupler (1). Of course, if not properly aligned, the first and second threads (35)(36) will not form the requisite spiral threads (7); thus, mating engagement of the split coupler (1) with the threaded end (13) of a conduit (10) can be precluded.

As detailed above, upon interlocking, proper axial alignment of the first and second threads (35)(36) can be facilitated by at least (i) the closed end (34) of the recess (29) which can act as a stop surface to correctly position the protrusion (28) and correspondingly, the first semi-circular member (2), relative to the second semi-circular member (3), and/or (ii) the dovetail or wedge construction of the length of the protrusion (28) and the corresponding recess (29).

Again referring primarily to FIGS. 4A through 4D, 6A through 6D, 8A through 9B, 10A, and 11 through 13B, as to particular embodiments, the split coupler (1) can further include an annular flange (8) radially inwardly extending from the coupler inner surface (5), whereby the flange (8) can be configured to axially and abuttingly engage with a flanged end (12) of a conduit (10) to catch that conduit (10) and secure it to another conduit (10) having a threaded end (13) so as to form, when screwed together via the split coupler (1), a secure connection between the conduits (10).

As the split coupler (1) is comprised of the first and second semi-cylindrical members (2)(3), the first semi-cylindrical member (2) can include a first flange (37) radially inwardly extending from the first semi-cylindrical member inner surface (14) between the first semi-cylindrical member first and second terminal edges (15)(16), and the second semi-cylindrical member (3) can include a second flange (38) radially inwardly extending from the second semi-cylindrical member inner surface (17) between the second semi-cylindrical member first and second terminal edges (18)(19). Upon interlocking of the first and second semi-cylindrical members (2)(3), the first and second flanges (37)(38) can axially align to form the annular flange (8) which extends into the throughbore (6).

The flange (37)(38) can be coupled to the inner surface (14)(17) of the semi-cylindrical member (2)(3) proximate the second axial surface (25)(27) or said another way, the flange (37)(38) can axially inwardly extend from the second axial surface (25)(27). Correspondingly, the threads (35)(36) can begin proximate the first axial surface (24)(26) of the semi-cylindrical member (2)(3) and terminate proximate a flange interior portion (39). Following, in use, to connect an emplaced conduit (10) having a flanged end (12) with an emplaced conduit (10) having a threaded end (13), the first and second semi-cylindrical members (2)(3) can be disposed about the conduit (10) having the flanged end (12) to position the first axial surface (24)(26) toward the conduit (10) having the threaded end (13). After the first and second semi-cylindrical members (2)(3) are interlocked, the split coupler (1) can be axially moved or slid toward the ends (12)(13) until the beginning of the spiral threads (7) engages with the threaded end (13). Subsequently, the split coupler (1) can be rotated to engage the threads (7)(13) and abuttingly engage the annular flange (8) with the flanged end (12) to securely connect the conduits (10).

It will be understood that, of course, in addition to a relatively easy installation (versus a conventional connector (11)) about an emplaced conduit (10) which does not mandate cutting the conduit (10), the instant split coupler (1) can also be relatively easily removed (versus a conventional connector (11)) from an emplaced conduit (10), for example by simply reversing the installation procedure, without having to cut the conduit (10) for removal.

Figure 10A:
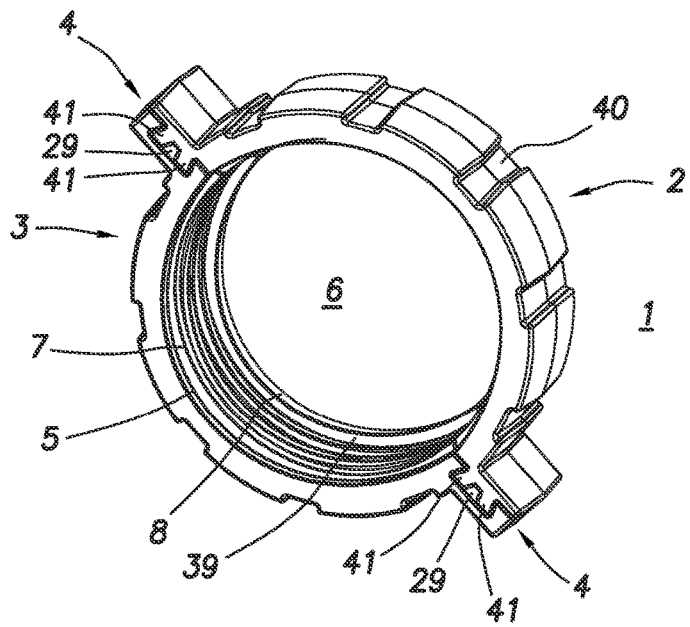
FIG. 10A is a perspective view showing the front of a particular embodiment of the inventive split coupler.
Figure 10B:
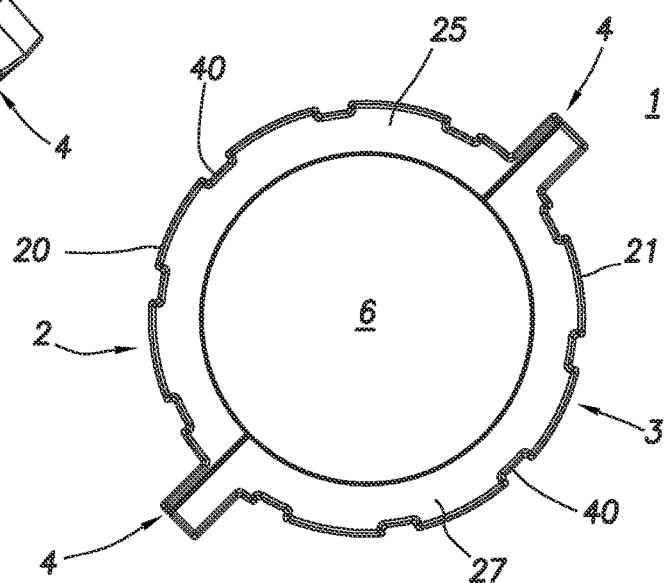
FIG. 10B is a rear view of the split coupler shown in FIG. 10A.
Figure 10C:
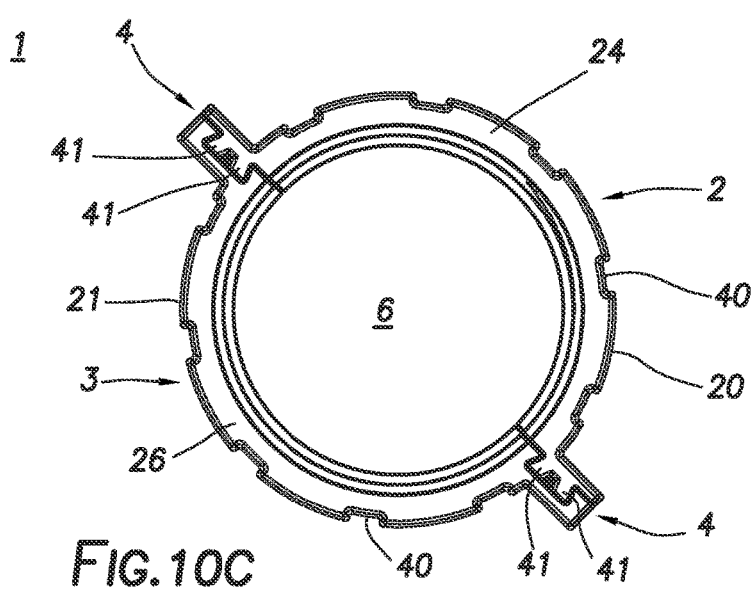
FIG. 10C is a front view of the split coupler shown in FIG. 10A.
Figure 10E:
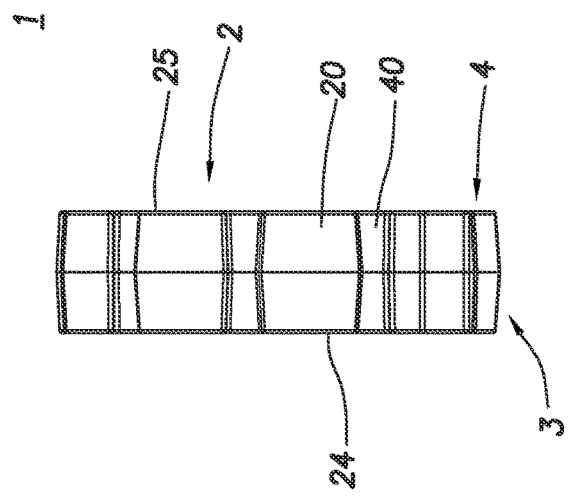
FIG. 10E is a right side view of the split coupler shown in FIG. 10A.
Figure 10G:
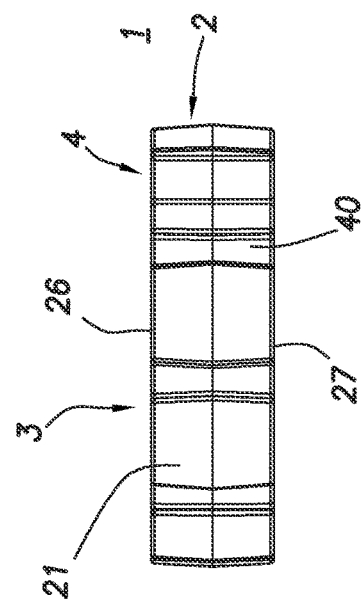
FIG. 10G is a bottom view of the split coupler shown in FIG. 10A.
Figure 10D:
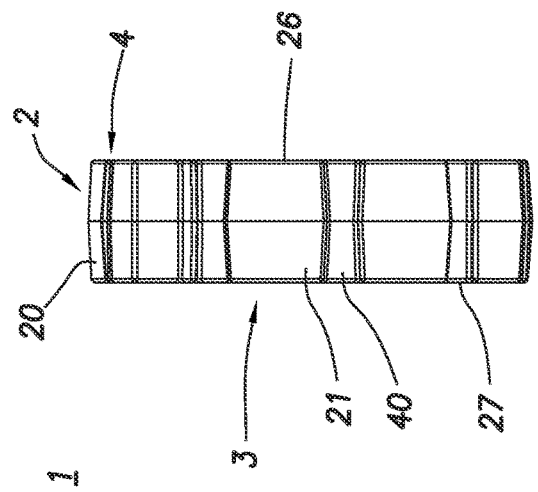
FIG. 10D is a left side view of the split coupler shown in FIG. 10A.
Figure 10F:
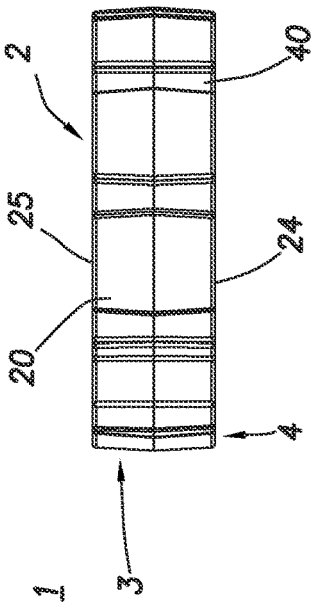
FIG. 10F is a top view of the split coupler shown in FIG. 10A.
Figure 11:
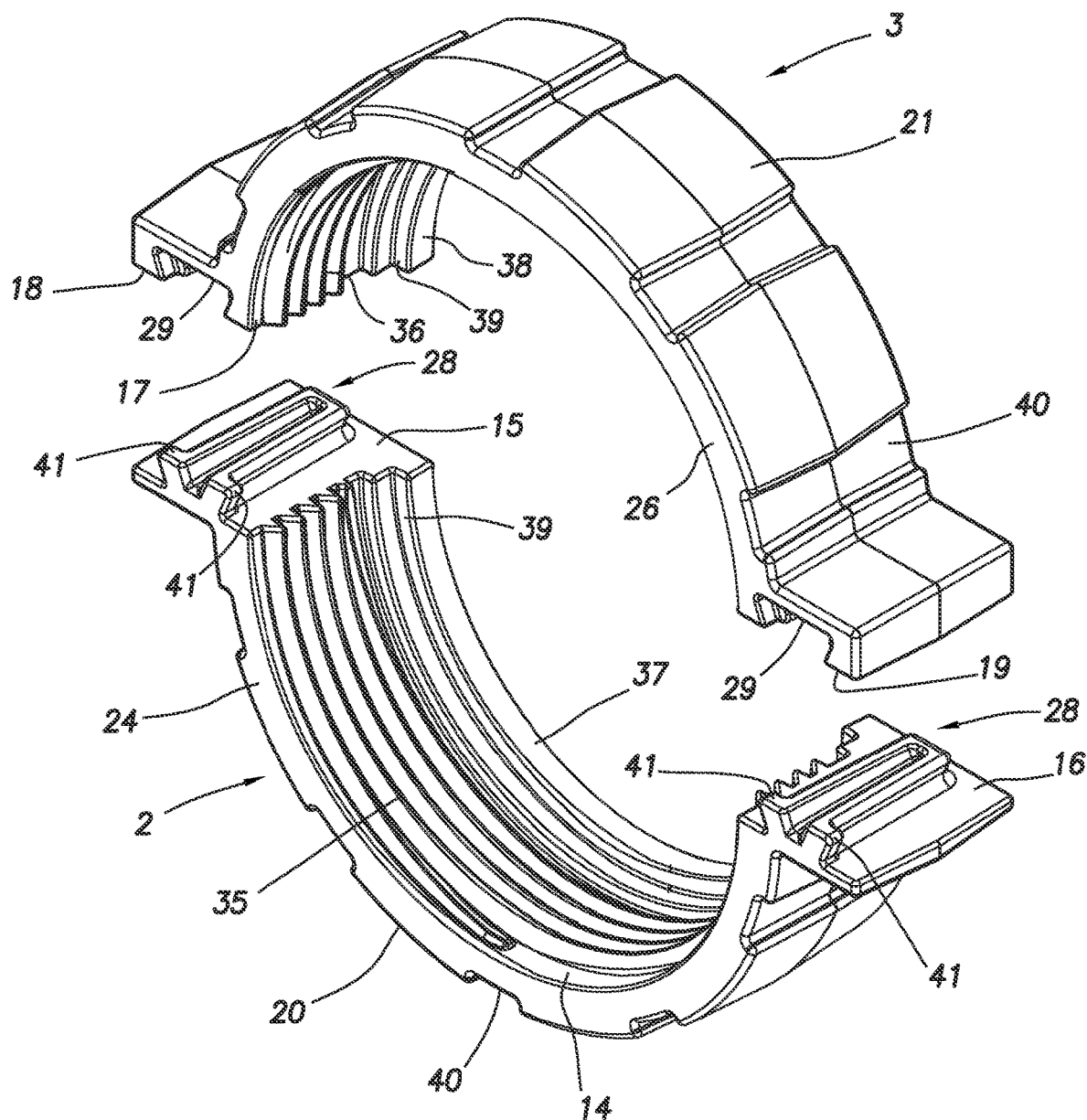
FIG. 11 is a perspective view showing the front of the first and second semi-cylindrical members of a particular embodiment of the inventive split coupler.
Figure 12A:
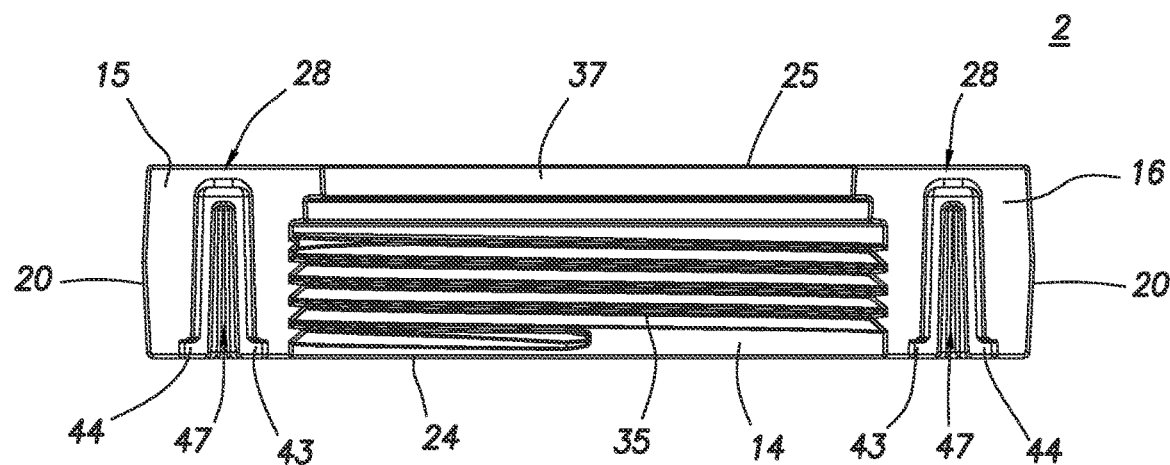
FIG. 12A is a view of the inner surface and terminal edges of a particular embodiment of the first semi-cylindrical member.
Figure 12B:
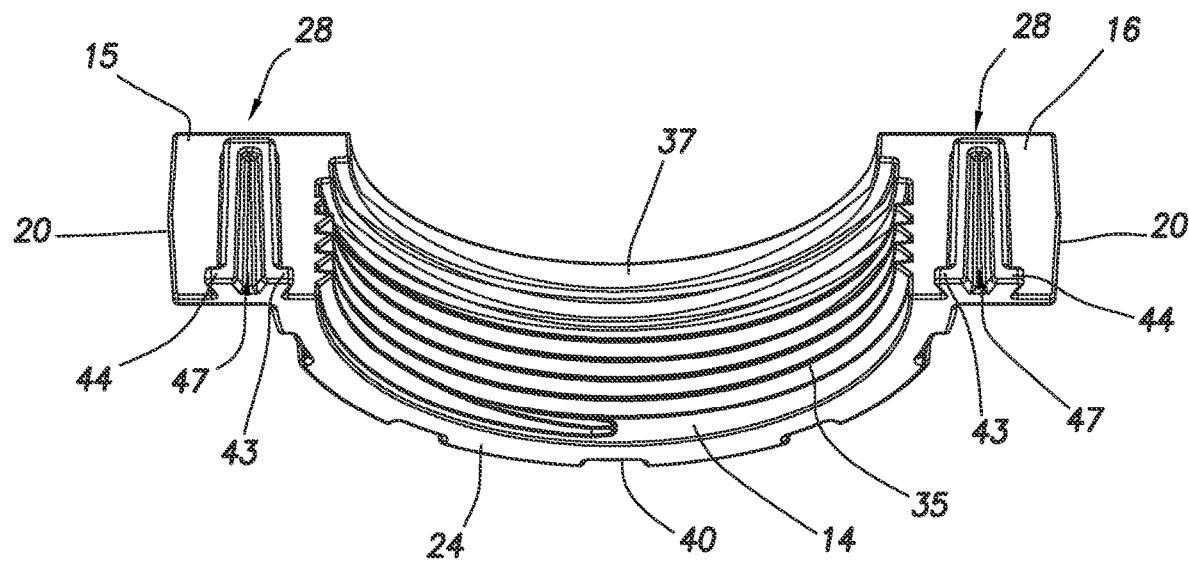
FIG. 12B is a perspective view of the inner surface and terminal edges of the first semi-cylindrical member shown in FIG. 12A.
Figure 13A:
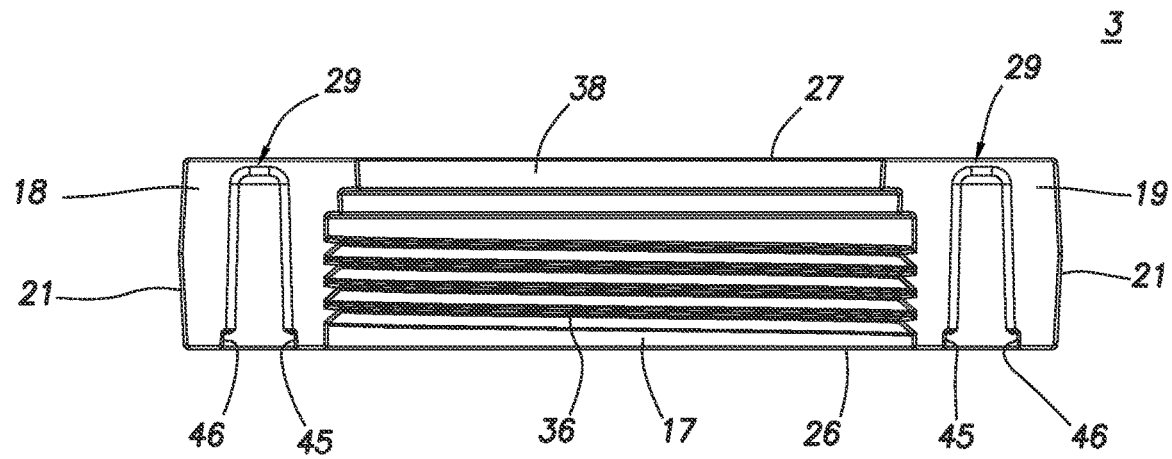
FIG. 13A is a view of the inner surface and terminal edges of a particular embodiment of the second semi-cylindrical member.
Figure 13B:
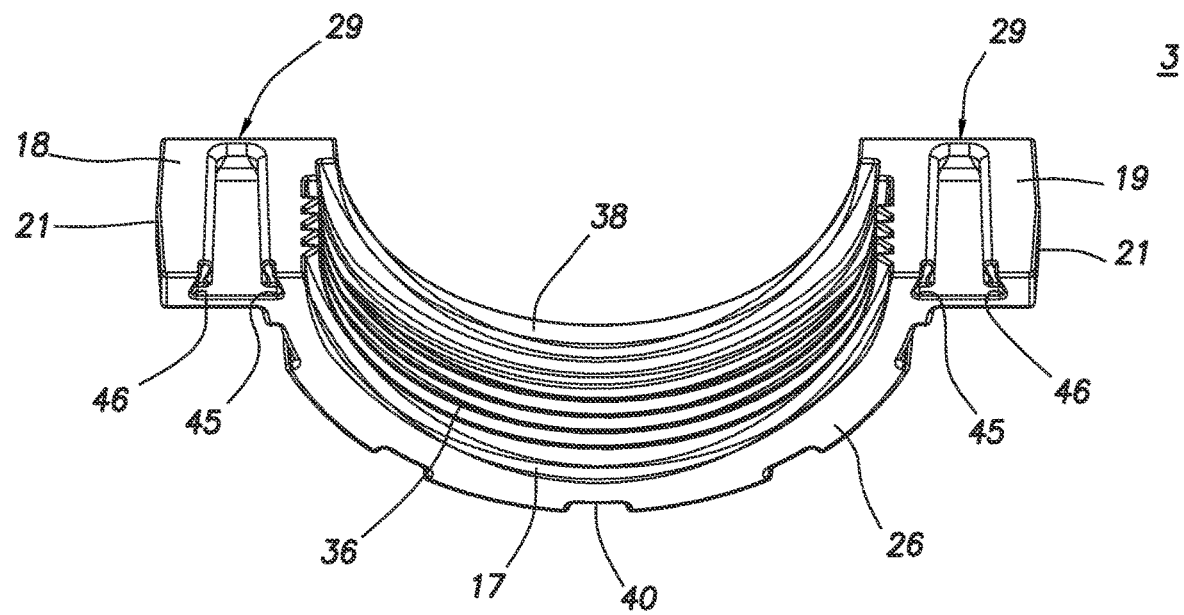
FIG. 13B is a perspective view of the inner surface and terminal edges of the second semi-cylindrical member shown in FIG. 13A.

Now referring primarily to FIGS. 4A through 7F and 10A through 11, as to particular embodiments, each of the first and second semi-cylindrical members (2)(3) can further include one or more grip elements (40) coupled to the outer surface (20)(21), whereby the grip elements (40) can facilitate interlocking the first and second semi-cylindrical members (2)(3) and/or fastening the split coupler (1) about emplaced conduits (10). As but one illustrative example, a grip element (40) can be configured as a protrusion radially outwardly extending from the outer surface (20)(21), whereby a plurality of protrusions can be disposed in circumferentially spaced apart relation proximate the outer surface (20)(21) (as shown in FIGS. 4A through 7F). As but a second illustrative example, a grip element (40) can be configured as a recess radially inwardly extending into the outer surface (20)(21), whereby a plurality of recesses can be disposed in circumferentially spaced apart relation proximate the outer surface (20)(21) (as shown in FIGS. 10A through 11).

As to particular embodiments, each of the terminal edges (15)(16)(18)(19) of the first and second semi-cylindrical members (2)(3) can radially outwardly extend from the outer surface (20)(21), which can provide a terminal edge (15)(16)(18)(19) with an increased surface area, advantageously allowing the interlocking assembly (4) and in particular, the protrusion (28) and the recess (29), to have a greater engageable surface area. Additionally, the radially outwardly extending portion of the terminal edges (15)(16)(18)(19) can facilitate gripping and subsequently interlocking the first and second semi-cylindrical members (2)(3) and/or fastening the split coupler (1) about emplaced conduits (10).

Now referring primarily to FIGS. 10A through 13B, as to particular embodiments, to ensure proper coupling of the first and second semi-cylindrical members (2)(3), the protrusion (28) can include a key (41) outwardly extending therefrom, for example in a lateral direction toward one of the first semi-cylindrical member inner or outer surfaces (14)(20), whereby the key (41) can be located proximate the first semi-cylindrical member first axial surface (24). Correspondingly, the recess (29) can include a keyway (42) outwardly extending therefrom, for example in a lateral direction toward one of the second semi-cylindrical member inner or outer surfaces (17)(21), whereby the keyway (42) can be located proximate the second semi-cylindrical member first axial surface (26).

As to particular embodiments, a pair of keys (41) can outwardly extend from the protrusion (28) in opposing directions; for example, a first key (43) can laterally outwardly extend from the protrusion (28) toward the first semi-cylindrical member inner surface (14) and a second key (44) can laterally outwardly extend from the protrusion (28) toward the first semi-cylindrical member outer surface (20). To complement, a pair of keyways (42) can outwardly extend from the recess (29) in opposing directions; for example, a first keyway (45) can laterally outwardly extend from the recess (29) toward the second semi-cylindrical member inner surface (17) and a second keyway (46) can laterally outwardly extend from the recess (29) toward the second semi-cylindrical member outer surface (21).

Now referring primarily to FIGS. 10A through 12B, as to particular embodiments including a protrusion (28) with one or more keys (41) outwardly extending therefrom, a medial portion (47) of the protrusion (28) can be substantially hollow or hollow, which may provide the protrusion (28) with an amount of flex, whereby such an amount of flex may enhance the receipt and/or frictional engagement of the protrusion (28) within the recess (29).

Now regarding production, a method of making the instant split coupler (1) can include providing a first semi-cylindrical member (2) and a second semi-cylindrical member (3), both having an interlocking assembly (4) configured to interlock the first and second semi-cylindrical members (2)(3) to form a substantially cylindrical split coupler (1) having a coupler inner surface (5) which defines a throughbore (6). Further, the method can include coupling first threads (35) to the first semi-cylindrical member inner surface (14), and coupling second threads (36) to the second semi-cylindrical member inner surface (17). Moreover, the method can further include coupling a first flange (37) to the first semi-cylindrical member inner surface (14), and coupling a second flange (38) to the second semi-cylindrical member inner surface (17).

The method of making particular embodiments of the split coupler (1) can further include providing additional components of the split coupler (1) as described above and in the claims.

As can be easily understood from the foregoing, the basic concepts of the present invention may be embodied in a variety of ways. The invention involves numerous and varied embodiments of a split coupler and methods for making and using such a split coupler.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result. Similarly, the antecedent "substantially" or "generally" means largely, but not wholly, the same form, manner or degree and the particular element will have a range of configurations as a person of ordinary skill in the art would consider as having the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the split coupler herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

The invention claimed is:

1. A split coupler, comprising:
   a first semi-cylindrical member comprising a first semi-cylindrical member inner surface and a first semi-cylindrical member outer surface, each extending between opposing first semi-cylindrical member first and second terminal edges;
   a second semi-cylindrical member comprising a second semi-cylindrical member inner surface and a second semi-cylindrical member outer surface, each extending between opposing second semi-cylindrical member first and second terminal edges;
   an interlocking assembly comprising (i) a protrusion outwardly extending from each of said first semi-cylindrical member first and second terminal edges in a circumferential direction, and (ii) a corresponding recess inwardly extending into each of said second semi-cylindrical member first and second terminal edges in a circumferential direction, said protrusions matably engageable with said recesses to interlock said first and second semi-cylindrical members to form a substantially cylindrical coupler having a coupler inner surface which defines a throughbore; and
   an annular flange radially inwardly extending from said coupler inner surface, a flange interior portion of said flange disposed in substantially orthogonal relation to said coupler inner surface;
   wherein in use, said flange abuttingly engages with a flanged end of an emplaced conduit.

2. The split coupler of claim 1, wherein said interlocking assembly interlocks as a result of axial movement of said first and second semi-cylindrical members relative to one another to slidably dispose said protrusions within said recesses.

3. The split coupler of claim 1, a height of said protrusion comprising a dovetail configuration, and a depth of said recess comprising a corresponding dovetail configuration.

4. The split coupler of claim 1, said protrusion extending along the length of said first semi-cylindrical member first or second terminal edge, and said recess extending along the length of said second semi-cylindrical member first or second terminal edge.

5. The split coupler of claim 4, said protrusion extending along the entirety of the length of said first semi-cylindrical member first or second terminal edge, and said recess extending along the entirety of the length of said second semi-cylindrical member first or second terminal edge.

6. The split coupler of claim 4, said protrusion extending along only a portion of the length of said first semi-cylindrical member first or second terminal edge, and said recess extending along only a portion of the length of said second semi-cylindrical member first or second terminal edge.

7. The split coupler of claim 6, wherein one end of the length of said recess is an open end and the opposing end of the length of said recess is a closed end.

8. The split coupler of claim 7, wherein said protrusion is receivable within said recess via only said open end.

9. The split coupler of claim 8, wherein said closed end provides a stop surface to preclude further axial travel of said protrusion within said recess.

10. The split coupler of claim 1, the length of said protrusion comprising a dovetail configuration, and the length of said recess comprising a corresponding dovetail configuration.

11. The split coupler of claim 1, wherein said protrusion is integrated with said first semi-cylindrical member first or second terminal edge, and said recess is integrated with said second semi-cylindrical member first or second terminal edge.

12. The split coupler of claim 1, further comprising spiral threads coupled to said coupler inner surface.

13. The split coupler of claim 12, wherein upon interlocking of said first and second semi-cylindrical members, said first and second threads axially align to form said spiral threads.

14. The split coupler of claim 1, said first semi-cylindrical member comprising a first flange radially inwardly extending from a first semi-cylindrical member inner surface between first semi-cylindrical member first and second terminal edges, and said second semi-cylindrical member comprising a second flange radially inwardly extending from a second semi-cylindrical member inner surface between second semi-cylindrical member first and second terminal edges.

15. The split coupler of claim 14, wherein upon interlocking of said first and second semi-cylindrical members, said first and second flanges axially align to form said annular flange.

16. The split coupler of claim 1, further comprising at least one grip element coupled to at least one of said first semi-cylindrical member outer surface or said second semi-cylindrical member outer surface.

17. The split coupler of claim 16, further comprising a plurality of said grip elements coupled to at least one of said first semi-cylindrical member outer surface or said second semi-cylindrical member outer surface in circumferentially spaced apart relation.

18. The split coupler of claim 1, wherein each of said first semi-cylindrical member first and second terminal edges radially outwardly extend from said first semi-cylindrical member outer surface, and said second semi-cylindrical member first and second terminal edges radially outwardly extend from said second semi-cylindrical member outer surface.

19. The split coupler of claim 1, wherein said first and second semi-cylindrical members are separate from one another.

* * * * *